3,453,290
PROCESS FOR PRODUCING 3,3-ALKYLENEDIOXY-
OR 3,3-DIALKOXYALKYL HALIDES
Ronald Propper, Fair Lawn, N.J., assignor to Hoffmann-
La Roche Inc., Nutley, N.J., a corporation of New
Jersey
No Drawing. Filed June 7, 1966, Ser. No. 555,698
Int. Cl. C07c 41/00, 43/30
U.S. Cl. 260—340.9                                5 Claims

ABSTRACT OF THE DISCLOSURE

A process for preparing primary 3,3-alkylenedioxy- or 3,3-dialkoxyalkyl halides from their corresponding 3,3-alkylenedioxy- or 3,3-dialkoxy-alk-1-enes by reaction with a hydrogen halide having an atomic number of from 17 to 53 inclusive under anhydrous conditions and at reduced temperature. The products of the process of this invention are useful intermediates in the synthesis of steroid compounds having progestational activity.

---

This invention is concerned with a process for producing 3,3-alkylenedioxy- or 3,3-dialkoxyalkyl halides as represented by the formula:

$$RCH_2ZCH_2CH_2X \qquad (I)$$

wherein R is hydrogen or lower alkyl, preferably n-alkyl of 1 to 3 carbons; Z is di(lower alkoxy)methylene or (lower alkylenedioxy)methylene; and X is a halogen having an atomic number of from 17 to 53, inclusive, i.e., chlorine, bromine, or iodine, and preferably is bromine.

By the terms "lower alkyl" and "lower alkoxy" are meant straight chain or branched chain alkyl and alkoxy groups containing up to about 6 carbons. Preferred alkyl and alkoxy groups are those having from 1 to 3 carbons, i.e., methyl, ethyl, or propyl, and methoxy, ethoxy, or propoxy. By "lower alkylenedioxy" is meant an alkylenedioxy group containing up to 6 carbons, with ethylenedioxy being preferred.

The products of Formula I above are produced by the reaction of a hydrogen halide, preferably hydrogen bromide, with a 3,3-alkylenedioxy- or 3,3-dialkoxyalk-1-ene of the formula:

$$RCH_2ZCH=CH_2 \qquad (II)$$

wherein R and Z are as defined above.

The production of terminal halide (I) from vinyl compound (II) is unexpected in view of the known reaction of allyl alcohol with hydrogen bromide to produce 2-bromo-1-propanol.

The process of this invention is effected under substantially anhydrous conditions and reduced temperature to prevent cleavage of the alkylene dioxy or dialkoxy grouping. By the term "reduced temperature" is meant a temperature of less than about room temperature, i.e., less than about 20–25° C. The minimum reaction temperature is not narrowly critical, but is preferably at least about −25° C. Temperatures in the range of from about −15° C. to about +10° C. are generally preferred.

Although the reaction may be effected in any substantially anhydrous inert organic medium, it is preferred that the reaction medium comprises a lower alkanol or lower alkanediol, the hydrocarbon portion of which is the same as the hydrocarbon portion of the alkoxy or alkylenedioxy group of vinyl compound (II). For example, when the alkoxy groups are methyl, methanol is employed; and when the alkylenedioxy group is ethylenedioxy, ethylene glycol is employed as the medium. The use of alcoholic media of this nature is desirable to prevent cleavage of the diether moiety of compounds (I) and (II) under the acidic conditions of this reaction. The amount of this alcoholic medium is not narrowly critical but is preferably sufficient to provide at least a 2:1 molar ratio of alcohol to vinyl compound (II). Preferred molar ratios are in the range of from about 5:1 to about 10:1.

The reaction is preferably effected by bubbling anhydrous hydrogen halide through a solution of vinyl compound (II) in the selected reaction medium. The amount of hydrogen halide added is not narrowly critical, although for optimum yields it is preferred to continue addition of hydrogen halide until the reaction mixture becomes saturated.

The products of this invention are recovered from the reaction mixture by known techniques. For example, excess hydrogen halide is neutralized, as by the addition of an alkali metal salt of a weak acid, for example sodium carbonate, preferably in admixture with a water-immiscible solvent for the product, for example a saturated hydrocarbon, such as pentane, hexane, and the like. After neutralization, the product mixture is extracted with water to remove the alcoholic reaction medium and inorgnic salts. The organic prase is then distilled or evaporated to leave halide (I) as the product.

Vinyl compound (II) is readily produced by known techniques from an alkyl ketone of the formula:

(III)

wherein R is as defined above.

For example, alkyl ketone (III) is reacted with a lower alkanol or lower alkanediol to produce a ketal, which then is reacted with bromine. The bromination may be effected either concurrently with the ketalization or may be effected subsequently thereto. The product of the bromination is a 2-bromoketal of Formula IV:

$$RCH_2ZCHBrCH_3 \qquad (IV)$$

wherein R and Z are as previously defined.

Vinyl compound (II) is then generated by treating 2-bromoketal (IV) with base, thereby effecting dehydrobromination.

In a preferred technique, bromination of the ketal of ketone (III) is effected on a 3,3-ethylenedioxyketal in an ethylene glycol medium. This medium, after separation of bromoketal (IV), comprises a solution of hydrogen bromide in ethylene glycol, which can be employed, at least in part, to effect the hydrobromination of the process of this invention, thereby effecting substantial economies in the use of bromine and hydrogen bromide.

The products of the process of this invention are useful intermediates in the synthesis of steroid compounds, as is illustrated by the following reaction sequence:

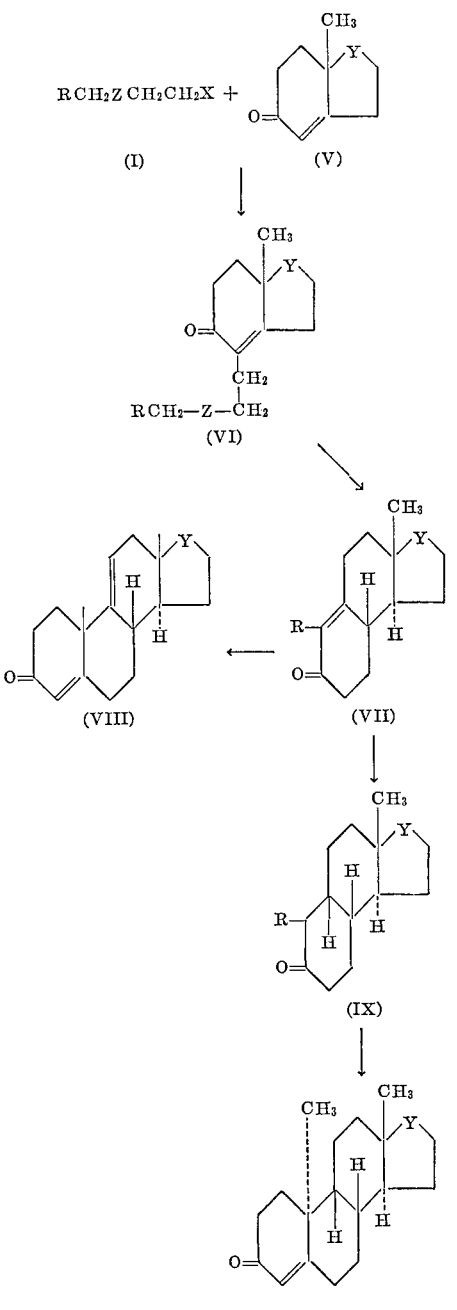

In accordance with this sequence, compound (I) is reacted with a 7,7a-dihydro-7aβ-methyl-5(6H)-indanone (V) wherein Y is carbonyl, hydroxymethylene, alkoxymethylene, acyloxymethylene, and the like. This reaction is effected in the presence of a base catalyst, such as an alkali metal hydroxide; an alkali metal alkoxide, e.g., sodium methoxide or sodium ethoxide; an alkali metal hydride; or an alkali metal amide, preferably at a temperature in the range of from 5–100° C. and under anhydrous and nonoxidizing conditions. The resulting 4-adduct (VI) is hydrogenated over a catalyst, such as palladium, rhodium, ruthenium, or platinum, in neutral alcoholic medium, at, for example, room temperature and atmospheric pressure. The resulting product is then cyclized under acidic conditions. Suitable acid catalysts include sulfuric acid, hydrochloric acid, hydrobromic acid, and the like. In addition to effecting cyclization, this acid treatment effects conversion of Z to a carbonyl group, resulting in the production of a 2,3,3a,4,5,7,8,9,9aβ,9bα-decahydro-3aβ-methyl-7-oxo-1H-benz[e]indene of Formula VII. This product may then be converted to an androsta-4,9(11)-dien-3-one of Formula VIII by known techniques. Alternatively, compound (VII) may, via hydrogenation over a suitable catalyst, such as those enumerated above, followed by base-catalyzed condensation with methyl vinyl ketone, be converted to a 9β,10α-androst-4-en-3-one of Formula X.

The following example is illustrative.

Example

A mixture of 430.6 grams (5.0 moles) of 3-pentanone, 341.4 grams (5.5 moles) of ethylene glycol, 0.100 gram of p-toluene-sulfonic acid, and 270 milliliters of hexane was refluxed with stirring for 40 hours while removing water with a Dean-Stark trap. The reaction mixture was cooled and 2.5 liters of ethylene glycol was added. The reaction mixture was then heated to 40° C. and 799.2 grams (5.0 moles) of bromine was added over a 3.5-hour period at a rate such that a slight bromine color was always present in the reaction mixture. The reaction temperature was maintained in the range of 35–40° C. during the addition. On completion of bromine addition, the reaction mixture was cooled to room temperature and extracted with 1500 milliliters of pentane and then with three 400-milliliter portions of pentane. The combined pentane extracts were shaken with 500 grams of anhydrous sodium carbonate. After filtration, the filtrate was concentrated at atmospheric pressure to a maximum temperature of 65° C. and then at 100 millimeters to a maximum temperature of 50° C. The residue was flash-distilled to recover a 952.3-gram fraction boiling at 60–68° C./2.5 millimeters, which was determined by vapor phase chromatography to be 97.6 percent pure 2-bromo-3,3-(ethylenedioxy)pentane.

A mixture of 391 grams (9.77 moles) of sodium hydroxide in 995 milliliters of methanol was refluxed until most of the sodium hydroxide had dissolved. After cooling slightly, 583 grams (2.79 moles) of 2-bromo-3,3-(ethylenedioxy)-pentane was added in one portion, followed by a few crystals of hydroquinone. After stirring at reflux under a nitrogen atmosphere for 24 hours, the reaction mixture was cooled to 15° C., poured into 2.4 liters of saturated sodium chloride solution, and extracted with two 400-milliliter portions of pentane and then with two 300-milliliter portions of pentane. The combined pentane extracts were dried over magnesium sulfate, filtered, and concentrated at atmospheric pressure to a maximum temperature of 65° C. and then at 100 millimeters of mercury to a 45° C. maximum temperature. On flash-distillation of the residue, there was recovered a 320.3-gram fraction boiling at 70–78° C./77 millimeters, which was determined by vapor phase chromatography to be 97.8 percent pure 3,3-(ethylendioxy)pentene-1.

A mixture of 33.0 grams (0.257 mole) of 3,3-(ethylenedioxy)pentene-1, 110 milliliters of ethylene glycol, and 0.33 gram of hydroquinone was chilled to −10° C. and anhydrous hydrogen bromide was bubbled into the reaction mixture at −10° C. to 0° C. until saturation had been reached (about one hour). After stirring an additional ten minutes at 0° C., the reaction mixture was poured into a mixture of 110 grams of anhydrous sodium carbonate and 240 milliliters of pentane. After stirring for 10 minutes to insure complete neutralization of the hydrogen bromide, a 500-milliliter portion of cold water was added. After separation of the pentane layer, the aqueous phase was extracted with pentane. The combined pentane extracts were dried over magnesium sulfate, filtered, and concentrated at atmospheric pressure and a maximum temperature of 50° C., and then at 100 millimeters and a maximum temperature of 45° C. On flash-distillation of the concentrate, there was recovered a 49.0-gram fraction boiling at 50–52° C./0.85 millimeter having an index of refraction $n_D^{25}$ of 1.4728. This fraction was determined to be 96.0 percent pure 1-bromo-3,3-(ethylenedioxy)pentane by vapor phase chromatography.

I claim:
1. The process for producing a compound as represented by the formula:

$$RCH_2ZCH_2CH_2X \qquad (I)$$

which comprises reacting a hydrogen halide of a halogen having an atomic number of from 17 to 53 with a compound represented by the formula:

$$RCH_2ZCH=CH_2 \qquad (II)$$

under anhydrous conditions and at reduced temperature wherein in the above formulae
R is a member selected from the group consisting of hydrogen and lower alkyl;
Z is a member selected from the group consisting of di(lower alkoxy)methylene and lower alkylenedioxy methylene; and
X is a halogen having an atomic number of from 17 to 53, inclusive.
2. The process as claimed in claim 1 wherein the halogenation is conducted in an alcohol solvent, the hydrocarbon portion of which is the same as the hydrocarbon portion of the alkoxy or alkylenedioxy group present on compound (II) and wherein the halogen is bromine.
3. The process as claimed in claim 2 wherein the temperature is in the range of from $-15°$ C. to $+10°$ C.
4. The process as claimed in claim 3 wherein Z is ethylene-dioxymethylene and the alcohol reaction medium is ethylene glycol.
5. The process as claimed in claim 4 wherein R is methyl.

References Cited

UNITED STATES PATENTS 2,960,495  11/1960  Stansbury et al. __ 260—340.9 X

NICHOLAS S. RIZZO, *Primary Examiner.*

J. H. TURNIPSEED, *Assistant Examiner.*

U.S. Cl. X.R.

260—340.7, 397.1, 397.4, 488, 586, 615